(12) United States Patent
Morgan et al.

(10) Patent No.: US 9,840,229 B2
(45) Date of Patent: Dec. 12, 2017

(54) METHODS AND SYSTEMS RELATED TO A REMOTE TAMPER DETECTION

(71) Applicant: **Gordon*Howard Associates, Inc.**, Littleton, CO (US)

(72) Inventors: Gerald A. Morgan, Littleton, CO (US); Stanley G. Schwarz, Littleton, CO (US); Christopher M. Macheca, Centennial, CO (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 0 days.

(21) Appl. No.: 15/590,477

(22) Filed: May 9, 2017

(65) Prior Publication Data
US 2017/0240137 A1    Aug. 24, 2017

Related U.S. Application Data

(63) Continuation-in-part of application No. 14/637,000, filed on Mar. 3, 2015, now Pat. No. 9,731,682, which
(Continued)

(51) Int. Cl.
*B60R 25/10* (2013.01)
*B60R 25/042* (2013.01)
(Continued)

(52) U.S. Cl.
CPC ........ *B60R 25/1003* (2013.01); *B60R 25/042* (2013.01); *B60R 25/045* (2013.01);
(Continued)

(58) Field of Classification Search
CPC . B60R 25/1003; B60R 25/042; B60R 25/045; B60R 25/33; B60R 25/1012
(Continued)

(56) References Cited

U.S. PATENT DOCUMENTS

| 4,335,370 A | 6/1982 | Scalley et al. |
| 4,592,443 A | 6/1986 | Simon |

(Continued)

FOREIGN PATENT DOCUMENTS

| EP | 1557807 | 7/2005 |
| KR | 10-2004-0073816 | 8/2004 |

(Continued)

OTHER PUBLICATIONS

US 5,699,633, 10/1999, Roser (withdrawn)
(Continued)

*Primary Examiner* — Thomas Mullen
(74) *Attorney, Agent, or Firm* — Conley Rose PC

(57) ABSTRACT

Remote tamper detection, some example embodiment methods including: receiving signals indicative of a location, the receiving by a first device coupled to an asset; periodically sending a signal of operability from the first device to a second device, the second device coupled to the asset, and the second device configured to selectively disable the asset; receiving a first command from a remote operations center, the receiving by the first device; sending a second command from the first device to the second device, wherein the second command is sent responsive to the receiving of the first command; disabling the asset by the second device when receipt of the signal of operability has ceased or the second command is a disable command; and issuing from the first device an indication of the location of the first device, the issuing from the first device by a wireless transmission to the remote operations center.

21 Claims, 7 Drawing Sheets

Related U.S. Application Data is a continuation of application No. 13/828,832, filed on Mar. 14, 2013, now Pat. No. 9,035,756.

(51) Int. Cl.
  *B60R 25/045* (2013.01)
  *B60R 25/33* (2013.01)
  *B60R 25/04* (2013.01)

(52) U.S. Cl.
  CPC .......... *B60R 25/1012* (2013.01); *B60R 25/33* (2013.01); *B60R 2025/0405* (2013.01)

(58) Field of Classification Search
  USPC .......................................... 340/426.1, 426.13
  See application file for complete search history.

(56) References Cited

U.S. PATENT DOCUMENTS

| | | |
|---|---|---|
| 4,624,578 A | 11/1986 | Green |
| 4,688,026 A | 8/1987 | Scribner et al. |
| 4,700,296 A | 10/1987 | Palmer, Jr. et al. |
| 4,736,294 A | 4/1988 | Gill et al. |
| 4,738,333 A | 4/1988 | Collier et al. |
| 4,800,590 A | 1/1989 | Vaughan |
| 5,014,206 A | 5/1991 | Scribner et al. |
| 5,132,968 A | 7/1992 | Cephus |
| 5,228,083 A | 7/1993 | Lozowick et al. |
| 5,359,528 A | 10/1994 | Haendel et al. |
| 5,426,415 A | 6/1995 | Prachar et al. |
| 5,490,200 A | 2/1996 | Snyder et al. |
| 5,495,531 A | 2/1996 | Smiedt |
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzi et al. |
| 5,797,134 A | 8/1998 | McMillan et al. |
| 5,818,725 A | 10/1998 | McNamara et al. |
| 5,819,869 A | 10/1998 | Horton |
| 5,857,024 A | 1/1999 | Nishino |
| 5,898,391 A | 4/1999 | Jefferies et al. |
| 5,917,405 A | 6/1999 | Joao |
| 5,928,291 A | 7/1999 | Jenkins et al. |
| 5,940,812 A | 8/1999 | Tengel et al. |
| 5,969,633 A | 10/1999 | Rosler |
| 5,970,143 A | 10/1999 | Schneier et al. |
| 5,970,481 A | 10/1999 | Westerlage et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,225,890 B1 | 5/2001 | Murphy |
| 6,232,874 B1 | 5/2001 | Murphy |
| 6,233,566 B1 | 5/2001 | Levine et al. |
| 6,249,217 B1 | 6/2001 | Forbes |
| 6,249,227 B1 | 6/2001 | Brady et al. |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,693,517 B2 | 2/2004 | McCarthy et al. |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,142,089 B2 | 11/2006 | Yamagishi |
| 7,149,623 B2 | 12/2006 | Flick |
| 7,205,679 B2 | 4/2007 | Flick |
| 7,224,083 B2 | 5/2007 | Flick |
| 7,228,417 B2 | 6/2007 | Roskind |
| 7,266,507 B2 | 9/2007 | Simon et al. |
| 7,292,152 B2 | 11/2007 | Torkkola et al. |
| 7,299,890 B2 | 11/2007 | Mobley |
| 7,310,618 B2 | 12/2007 | Libman |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,427,924 B2 | 9/2008 | Ferrone et al. |
| 7,542,921 B1 | 6/2009 | Hildreth |
| 7,561,102 B2 | 7/2009 | Duvall |
| 7,814,005 B2 | 10/2010 | Imrey et al. |
| 7,818,254 B1 | 10/2010 | Ma |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,904,332 B1 | 3/2011 | Merkley |
| 7,930,211 B2 | 4/2011 | Crolley |
| 8,018,329 B2 | 9/2011 | Morgan et al. |
| 8,086,523 B1 | 12/2011 | Palmer |
| 8,095,394 B2 | 1/2012 | Nowak et al. |
| 8,140,358 B1 | 3/2012 | Ling et al. |
| 8,217,772 B2 | 7/2012 | Morgan et al. |
| 8,325,025 B2 | 12/2012 | Morgan et al. |
| 8,344,894 B2 | 1/2013 | Szczerba et al. |
| 8,370,027 B2 | 2/2013 | Pettersson et al. |
| 8,370,925 B2 | 2/2013 | Childress et al. |
| 8,510,556 B2 | 8/2013 | Cao et al. |
| 8,630,768 B2 | 1/2014 | McClellan et al. |
| 8,653,956 B2 | 2/2014 | Berkobin et al. |
| 8,754,751 B1 | 6/2014 | Picolli |
| 8,841,987 B1 | 9/2014 | Stanfield et al. |
| 9,002,536 B2 | 4/2015 | Hatton |
| 2001/0034577 A1 | 10/2001 | Grounds et al. |
| 2001/0040503 A1 | 11/2001 | Bishop |
| 2002/0019055 A1 | 2/2002 | Brown |
| 2002/0091473 A1 | 7/2002 | Gardner et al. |
| 2002/0120371 A1 | 8/2002 | Leivian et al. |
| 2002/0120374 A1 | 8/2002 | Douros |
| 2002/0193926 A1 | 12/2002 | Katagishi et al. |

(56) References Cited

U.S. PATENT DOCUMENTS

| | | |
|---|---|---|
| 2003/0036823 A1 | 2/2003 | Mahvi |
| 2003/0095046 A1 | 5/2003 | Borugian |
| 2003/0101120 A1 | 5/2003 | Tilton |
| 2003/0151501 A1 | 8/2003 | Teckchandani et al. |
| 2003/0191583 A1 | 10/2003 | Uhlmann et al. |
| 2003/0231550 A1 | 12/2003 | MacFarlane |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0024203 A1 | 2/2005 | Wolfe |
| 2005/0030184 A1 | 2/2005 | Victor |
| 2005/0033483 A1 | 2/2005 | Simon et al. |
| 2005/0128080 A1 | 6/2005 | Hall et al. |
| 2005/0134438 A1 | 6/2005 | Simon |
| 2005/0162016 A1 | 7/2005 | Simon |
| 2005/0200453 A1 | 9/2005 | Turner et al. |
| 2005/0231323 A1 | 10/2005 | Underdahl et al. |
| 2005/0270178 A1 | 12/2005 | Ioli |
| 2006/0028431 A1 | 2/2006 | Leong |
| 2006/0059109 A1 | 3/2006 | Grimes |
| 2006/0080599 A1 | 4/2006 | Dubinsky |
| 2006/0100944 A1 | 5/2006 | Reddin et al. |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0021100 A1 | 1/2007 | Haave et al. |
| 2007/0038351 A1 | 2/2007 | Larschan et al. |
| 2007/0082614 A1 | 4/2007 | Mock |
| 2007/0139189 A1 | 6/2007 | Helmig |
| 2007/0146146 A1 | 6/2007 | Kopf et al. |
| 2007/0176771 A1 | 8/2007 | Doyle |
| 2007/0179692 A1 | 8/2007 | Smith et al. |
| 2007/0185728 A1 | 8/2007 | Schwarz et al. |
| 2007/0194881 A1 | 8/2007 | Schwarz et al. |
| 2007/0222588 A1 | 9/2007 | Wolfe |
| 2007/0224939 A1 | 9/2007 | Jung et al. |
| 2007/0285207 A1 | 12/2007 | Bates |
| 2007/0288271 A1 | 12/2007 | Klinkhammer |
| 2007/0299567 A1 | 12/2007 | Simon et al. |
| 2008/0042814 A1 | 2/2008 | Hurwitz et al. |
| 2008/0109378 A1 | 5/2008 | Papadimitriou |
| 2008/0114541 A1 | 5/2008 | Shintani et al. |
| 2008/0150683 A1 | 6/2008 | Mikan et al. |
| 2008/0162034 A1 | 7/2008 | Breen |
| 2008/0221743 A1 | 9/2008 | Schwarz et al. |
| 2008/0223646 A1 | 9/2008 | White |
| 2008/0231446 A1 | 9/2008 | Cresto |
| 2008/0243558 A1 | 10/2008 | Gupte |
| 2008/0245598 A1 | 10/2008 | Gratz et al. |
| 2008/0255722 A1 | 10/2008 | McClellan et al. |
| 2008/0294302 A1 | 11/2008 | Basir |
| 2009/0043409 A1 | 2/2009 | Ota |
| 2009/0051510 A1 | 2/2009 | Follmer et al. |
| 2009/0182216 A1 | 7/2009 | Roushey, III et al. |
| 2009/0234770 A1 | 9/2009 | Simon |
| 2009/0237249 A1 | 9/2009 | Bielas |
| 2009/0248222 A1 | 10/2009 | McGarry et al. |
| 2009/0284359 A1 | 11/2009 | Huang et al. |
| 2009/0284367 A1 | 11/2009 | Pfafman et al. |
| 2009/0295537 A1 | 12/2009 | Lane et al. |
| 2010/0030586 A1 | 2/2010 | Taylor et al. |
| 2010/0045452 A1 | 2/2010 | Periwal |
| 2010/0063850 A1 | 3/2010 | Daniel |
| 2010/0075655 A1 | 3/2010 | Howarter et al. |
| 2010/0090826 A1 | 4/2010 | Moran et al. |
| 2010/0148947 A1 | 6/2010 | Morgan et al. |
| 2010/0238009 A1 | 9/2010 | Cook et al. |
| 2010/0268402 A1 | 10/2010 | Schwarz et al. |
| 2010/0312691 A1 | 12/2010 | Johnson, Jr. |
| 2011/0040630 A1 | 2/2011 | Weiss |
| 2011/0050407 A1 | 3/2011 | Schoenfeld et al. |
| 2011/0057800 A1 | 3/2011 | Sofer |
| 2011/0084820 A1 | 4/2011 | Walter et al. |
| 2011/0148626 A1 | 6/2011 | Acevedo |
| 2011/0153143 A1 | 6/2011 | O'Neil et al. |
| 2011/0210867 A1 | 9/2011 | Benedikt |
| 2011/0270779 A1 | 11/2011 | Showalter |
| 2012/0066011 A1 | 3/2012 | Ichien et al. |
| 2012/0068858 A1 | 3/2012 | Fredkin |
| 2012/0068886 A1 | 3/2012 | Torres |
| 2012/0089423 A1 | 4/2012 | Tamir et al. |
| 2012/0098678 A1 | 4/2012 | Rathmacher et al. |
| 2012/0158356 A1 | 6/2012 | Prochaska et al. |
| 2012/0203441 A1 | 8/2012 | Higgins et al. |
| 2012/0212353 A1 | 8/2012 | Fung et al. |
| 2012/0221216 A1 | 8/2012 | Chauncey et al. |
| 2013/0018677 A1 | 1/2013 | Chevrette |
| 2013/0074107 A1 | 3/2013 | Hyde et al. |
| 2013/0074111 A1 | 3/2013 | Hyde et al. |
| 2013/0074112 A1 | 3/2013 | Hyde et al. |
| 2013/0074115 A1 | 3/2013 | Hyde et al. |
| 2013/0099892 A1 | 4/2013 | Tucker et al. |
| 2013/0127617 A1 | 5/2013 | Baade et al. |
| 2013/0138460 A1 | 5/2013 | Schumann et al. |
| 2013/0141252 A1 | 6/2013 | Ricci |
| 2013/0144460 A1 | 6/2013 | Ricci |
| 2013/0144461 A1 | 6/2013 | Ricci |
| 2013/0144469 A1 | 6/2013 | Ricci |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0204455 A1 | 8/2013 | Chia et al. |
| 2013/0338914 A1 | 12/2013 | Weiss |
| 2014/0191858 A1 | 7/2014 | Morgan et al. |
| 2014/0225724 A1 | 8/2014 | Rankin et al. |
| 2014/0358896 A1 | 12/2014 | Camacho et al. |
| 2016/0090923 A1 | 3/2016 | Al Salah |

FOREIGN PATENT DOCUMENTS

| | | |
|---|---|---|
| WO | 9616845 | 6/1996 |
| WO | 2007092272 | 8/2007 |
| WO | 2007092287 | 8/2007 |
| WO | 2010/068438 A2 | 6/2010 |
| WO | 2010062899 | 6/2010 |
| WO | 2012/097441 A1 | 7/2012 |

OTHER PUBLICATIONS

On Time Payment Protection Systems, printed Jan. 2, 2004 from www.ontime-pps.com/how.html, 2 pages.

Aircept Products, printed Jan. 2, 2004 from www.aircept.com/products.html, 1 page.

How PayTeck Works, printed Jan. 2, 2004 from www.payteck.cc/aboutpayteck.html, 1 page.

Article: "Pager Lets You Locate Your Car, Unlock and Start It", published Dec. 10, 1997 in USA Today, 1 page.

Article: "Electronic Keys Keep Tabs on Late Payers", published Sep. 22, 1997 in Nonprime Auto News, 1 page.

Credit Chip 200G Series and The Credit Chip 200G Series, C-Chip Technologies Corp., date unknown.

C-Chip Technologies User Guide, C-Chip Technologies Corp., date unknown.

Article: "PASSTEC Device Safely Prevents Vehicles from Starting", published Jul. 19, 1999 in Used Car News, 1 page.

Payment Clock Disabler advertisement, published, May 18, 1998, 1 page.

Secure Your Credit & Secure Your Investment (Pay Teck advertisement), printed Jan. 2, 2004 from www.payteck.cc, 1 page.

Metrik Company Information, printed Dec. 21, 2006 from imetrik.com, 1 page.

About C-CHIP Technologies, printed Dec. 21, 2006 from www.c-chip.com, 1 page.

(56) References Cited

OTHER PUBLICATIONS

HI-Tech tools to solve traditional problems, printed Dec. 21, 2006 from www.c-chip.com, 1 page.
C-CHIP Technologies Products: Credit Chip 100, Credit Chip 100C, Credit Chip 200, printed Dec. 21, 2006 from www. c-chip.com, 1 page.
The Credit Chip 100, printed Dec. 21, 2006 from www.c-chip.com.
EEC-EN0F204RK Panasonic Electronic Components | P14164CT-ND | DigiKey. Web. Accessed Feb. 13, 2013. www.digikey.com/product-detail/en/EEC-EN0F204RK/P14164CT-ND/1937322.
Fogerson, R. et al. "Qualitative Detection of Opiates in Sweat by EIA and GC-MS". Journal of Analytical Toxicology. Oct. 6, 1997, vol. 21, No. 6, pp. 451-458(8) (Abstract).
De La Torre, R. et al. "Usefulness of Sweat Testing for the Detection of Cannabis Smoke." 2004 American Association for Clinical Chemistry, Inc. 29th Arnold O. Beckman Conference. Apr. 12-13, 2011. San Diego, CA.

METHODS AND SYSTEMS RELATED TO A REMOTE TAMPER DETECTION

CROSS-REFERENCE TO RELATED APPLICATIONS

This application is a continuation-in-part of U.S. application Ser. No. 14/637,000 titled "Methods and Systems Related to a Remote Tamper Detection," filed Mar. 3, 2015, which is a continuation of U.S. application Ser. No. 13/828,832 titled "Methods and Systems Related to Remote Tamper Detection," filed Mar. 14, 2013 (now U.S. Pat. No. 9,035,756), both of which are incorporated herein by reference as if reproduced in full below.

BACKGROUND

In some situations, it is desirable to track the location of an asset. A device may be coupled to the asset to communicate location information to an operations center. It may be beneficial for the device to include tamper detection capabilities in case someone tries to disable or remove the device.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Remote" shall mean one kilometer or more.

"Supercapacitor" shall mean one or more electrical components, either alone or in parallel having a capacitance density of at least 3.0 millifarads per cubic millimeter (mF/mm$^3$).

"Periodically," in reference to sending a signal, shall mean a recurring action, but shall not require each action to occur at equal intervals of time.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to systems and methods of detecting tampering of at least one onboard device coupled to a vehicle. In particular, two devices installed within a vehicle are communicatively linked, and if the link is determined to have been improperly broken, alerts and/or actions are subsequently taken. The developmental context is detecting tampering with at least one onboard device used to aid in ensuring payment on a vehicle loan, and thus the specification will be based on the development context; however, the developmental context shall not be read as a limitation as to the applicability of the various embodiments, as the methods described herein may apply to other tamper detecting scenarios for other mobile and non-mobile assets. The specification first turns to a high level system overview.

Figure 1:
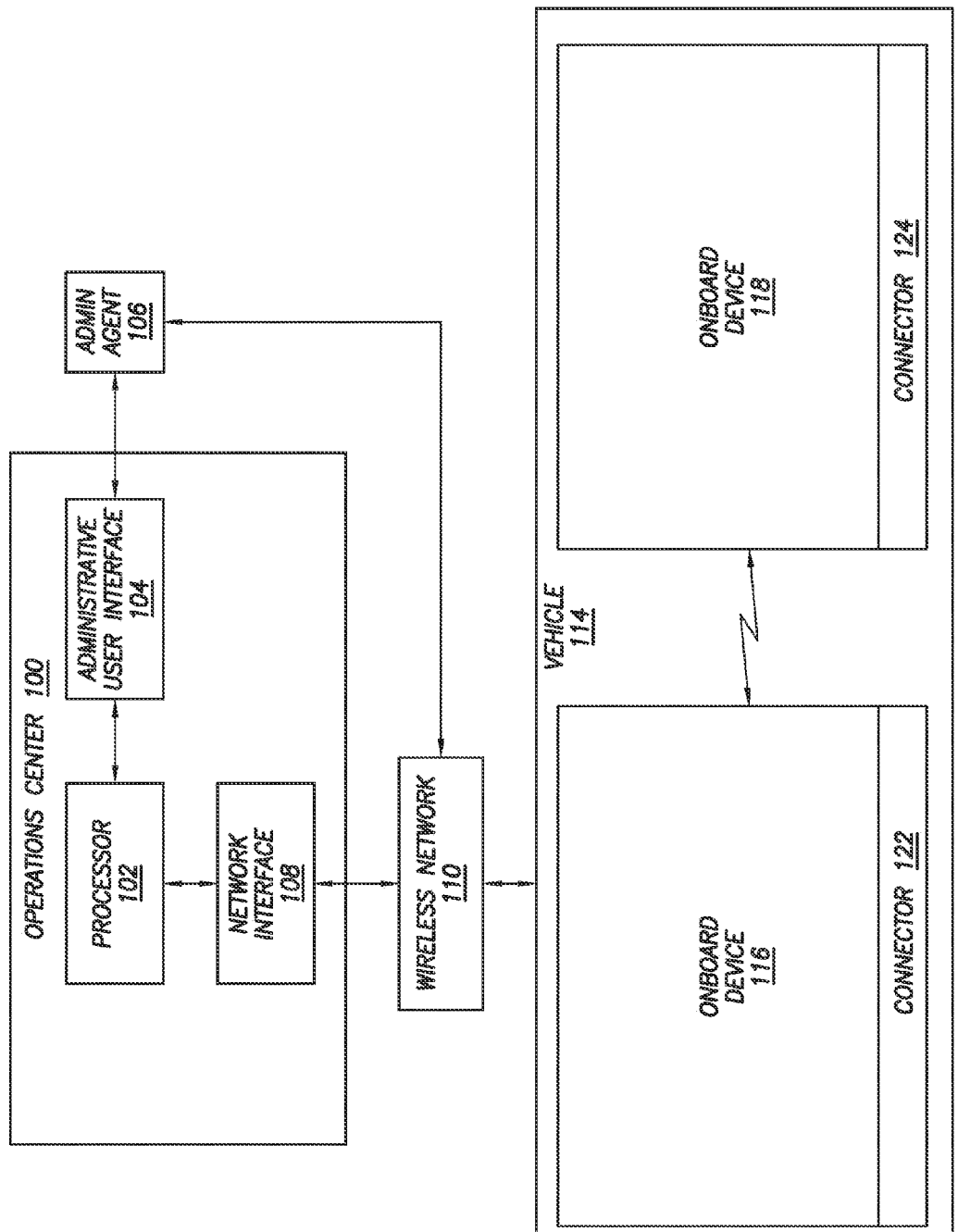
FIG. 1 shows, in block diagram form, a system in accordance with at least some embodiments.

FIG. 1 shows, in block diagram form, a system in accordance with at least some embodiments. In particular, the system comprises an operations center 100 communicatively coupled to a vehicle 114 by way of a wireless network 110. The operations center 100 comprises a processor 102. In some embodiments, the processor 102 may be a stand-alone computer system, or the processor may comprise a plurality of computer systems communicatively coupled and performing the functions of the operations center 100, the functions discussed more thoroughly below. The processor 102 may couple to an administrative user interface 104. The administrative user interface 104 may enable an administrative agent 106 to control or configure the operation of the system.

In one embodiment, in order to communicate with vehicle 114, the operations center 100 may further comprise a network interface 108 communicatively coupled to the processor 102. By way of the network interface 108, the processor 102, and any programs executing thereon, may communicate with vehicle 114, such as by wireless network 110. Wireless network 110 is illustrative of any suitable communications network, such as a cellular network, a Wireless Fidelity (Wi-Fi) network, satellite communication network, or other mechanism, or combinations of mechanisms, for transmitting information between the operations center 100 and the vehicle 114.

In accordance with at least some embodiments, the operations center 100 is remotely located from the vehicle 114. In some cases, the operations center 100 and vehicle 114 may be located within the same city or state. In other cases, the operations center 100 may be many hundreds or thousands of miles from vehicle 114, and thus the illustrative wireless network 110 may span several different types of communication networks.

Still referring to FIG. 1, the system further comprises a vehicle 114 communicatively coupled to operations center 100 by way of the illustrative wireless network 110. The vehicle 114 may comprise at least two onboard devices: illustrative onboard device 116 and illustrative onboard device 118.

At least one, if not both, onboard devices may have location tracking capabilities and/or vehicle disablement capabilities. Tracking the location of the vehicle may be beneficial in many situations. In one example situation, a lending institution financing a vehicle purchase may be interested in the ability to track the vehicle in the event timely payments are not made on the loan. In particular, a driver purchases vehicle 114 by receiving financing from a financing institution (e.g., a bank, a dealership). The financing institution may request that onboard device 116 and/or 118 be installed within vehicle 114 to track the location of the vehicle and/or to disable the vehicle in the event of a non-payment. A driver who has not made a payment, or who is intending not to make a payment, and aware of the possibility of vehicle disablement or repossession may attempt to tamper with the disabling onboard device by removing it from the vehicle, or otherwise disconnecting it. In order to prevent the driver from tampering with the device and thus circumventing the locating tracking and/or disablement capabilities, onboard devices 116 and 118 are placed within different areas of vehicle 114. For example, one onboard device may be located in an inconspicuous location, such as within an electrical compartment under the hood or within the luggage compartment, and the other onboard device may be located in a conspicuous location, such as under the dashboard of the vehicle. By placing the onboard devices in different locations, the driver may not be aware of a second device, or may have difficulty locating the second device.

In order to detect tampering, the onboard devices communicate with each other. In one embodiment, if one or both of the onboard devices detects there is no longer a communicative link between the devices, the lack of a signal may indicate tampering. For example, onboard device 116 may have the capability of sending onboard device 118 a communication related to operability. The onboard device 118 may have the capability of sending a return message to the onboard device 116 acknowledging receipt of the message of operability. In the alternative, onboard device 118 may send the message of operability, whereas onboard device 116 may send the message acknowledging receipt. Thus, onboard devices 116 and 118 have two-way communications capabilities with each other.

Upon receiving a message from the other onboard device, one or both of the onboard devices may take appropriate action, such as sending an alert of tampering, sending an indication of last known location, and/or disabling the vehicle. In order to more fully understand the methods and system associated with detecting tampering and taking subsequent action, the onboard devices will now be described in more detail.

Figure 2:
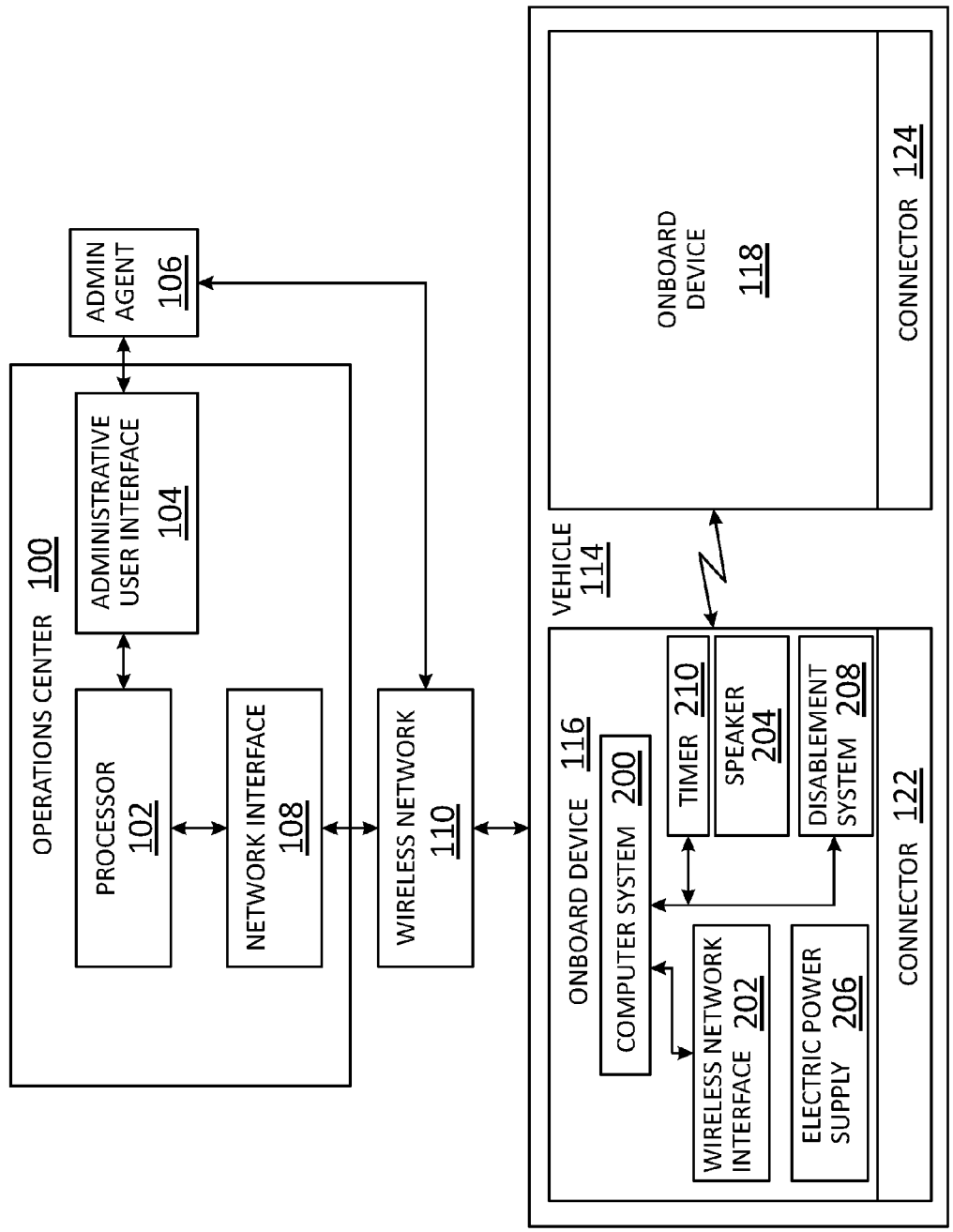
FIG. 2 shows, in block diagram form, a system in accordance with at least some embodiments.

FIG. 2 shows the overall system from FIG. 1 combined with a more detailed depiction of example onboard device 116. In particular, onboard device 116 is configured to couple to vehicle 114. Onboard device 116 may be defined as a separately enclosed device both mechanically and electrically coupled to the vehicle 114 by way of connector 122. That is, connector 122 may provide mechanical support that holds the onboard device 116 in place, and/or by way of the connector 122 the onboard device 116 may electrically couple to other components of the vehicle 114. For example, connector 122 may enable coupling between onboard device 116 to the onboard diagnostic version two ("OBD-II") port, thus giving onboard device 116 the ability to communicate with one or more components of the vehicle 114 such as the vehicle computer (not specifically shown), a starter solenoid relay connector, or fuel pump relay connector.

Onboard device 116 may comprise a computer system 200. Although not specifically shown, the onboard device computer system 200 may comprise a processor, where the processor may communicate with subsystems of the vehicle over the connector 122, such as a computer system (not specifically shown) of the vehicle 114. The onboard device 116 configured to couple to the OBD-II port may also have the ability to read or determine data associated with the vehicle 114, such as determining the identity of the vehicle (e.g., by reading the vehicle identification number, hereafter "VIN"), and may also have the ability to command the computer system of the vehicle to disable certain functions (e.g. starter circuit, spark ignition, fuel system) such that the vehicle 114 may be disabled at the command of the onboard device 116, discussed in more detail below.

The onboard device 116 may further comprise a wireless network interface 202 coupled to the computer system 200. By way of the wireless network interface 202, programs executed by the computer system 200 may communicate with other devices. In particular, the wireless network interface 202 may be the interface through which onboard device 116 sends and receives signals of operability and communications to and from onboard device 118. In some embodiments, the wireless network interface 202 enables the computer system 200 to communicate with operations center 100 by way of a wireless transmission through the wireless network 110.

In addition to communications over the wireless network interface 202, onboard device 116 may comprise a speaker 204 which broadcasts sounds received by a microphone coupled to onboard device 118 (discussed more below). The sounds may be alerts indicative of a loss of power or communication, and thus may be indicative of tampering between the devices.

Furthermore, onboard device 116 may comprise a disablement system 208 that can selectively disable the vehicle 114. Disablement may take many forms. For example, the onboard device may disable the vehicle by any suitable technique, such as disabling the ability to crank the engine, disabling the spark ignition system, disabling the fuel pump relay, disabling by way of a starter interrupt, or a combination of disabling mechanisms. In other embodiments, the onboard device 116 may be a relay replacement device. For example, a starter relay is a device within a vehicle that, when activated, provides electrical current to the solenoid of the starter. In the event communication is lost with onboard device 118, the onboard device 116 may not provide current to the solenoid in spite of a command to do so. Thus, connector 122 may be a relay connector. In yet still other cases, the onboard device 116 may be a relay replacement device for any system that could disable the vehicle (e.g., either prevents the motor from starting, or prevents the motor from continuing to operate).

In addition, onboard device 116 may disable vehicle 114 on command from the operations center 100. In particular, the operations center may comprise disablement services described above, and at the request of any authorized entity (e.g., an administrative agent, a lending institution, a dealership), vehicle 114 may be disabled. Onboard device 118 will now be discussed in more detail with reference to FIG. 3.

Figure 3:
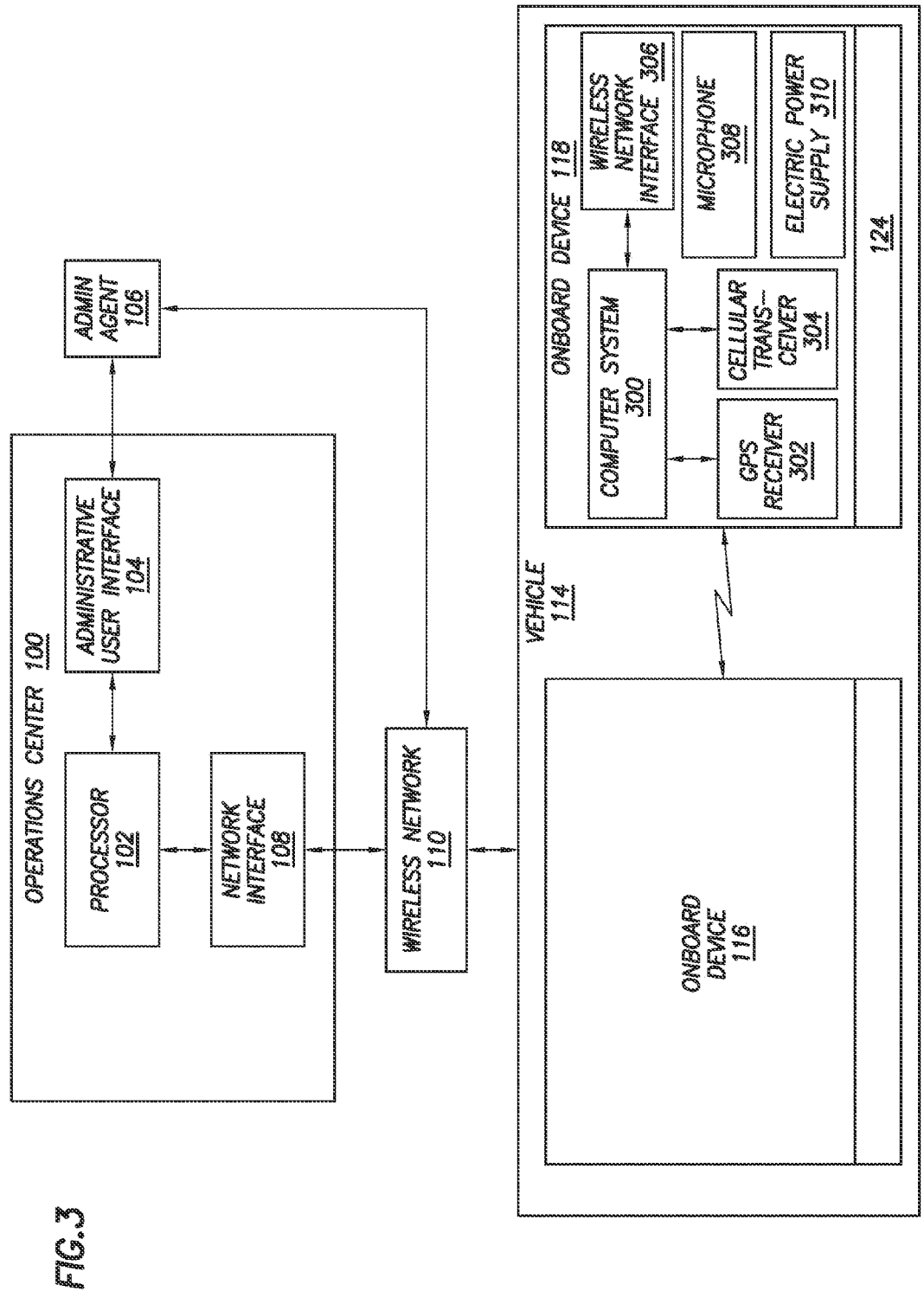
FIG. 3 shows, in block diagram form, a system in accordance with at least some embodiments.

FIG. 3 shows the overall system with a more detailed depiction of onboard device 118. In particular, onboard device 118 is configured to couple to vehicle 114. Like onboard device 116, onboard device 118 is a separately enclosed device distinct from onboard device 116. The onboard device 118 may be both mechanically and electrically coupled to the vehicle 114 by way of connector 124. That is, connector 124 may provide mechanical support that holds the onboard device 118 in place, and/or by way of the connector 124 the onboard device 118 may electrically couple to other components of the vehicle 114. For example, connector 122 may enable coupling between onboard device 118 to the OBD-II port, thus giving onboard device 118 the ability to communicate with one or more components of the vehicle 114 such as the vehicle computer (not specifically shown).

In one embodiment, the onboard device 118 further comprises a global position system (GPS) receiver 302 coupled to onboard computer system 300. The GPS receiver 302 receives signals from an array of GPS satellites orbiting the earth, and based on timing associated with arrival of those signals, a location of the onboard device 118 (and thus the vehicle 114) can be determined. In some cases, the GPS receiver 302 has sufficient functionality to calculate location, and thus the data passed to computer system 300 may be a direct indication of location. In other cases, the functionality to determine location may be shared between the GPS receiver 302 and software executing on the processor 102, by way of wireless network 110. That is, the GPS receiver 302 may receive the plurality of GPS signals and pass the information to a program on the processor 102, which program may then make the determination as to location of the onboard device 118, and thus the vehicle 114.

In one embodiment, the onboard device 118 tracks the vehicle with high precision, thus one may be able to identify the street and block at which the vehicle is passing at any given time (though the onboard device 118 may not necessarily have or contain street level databases). In other cases, the onboard device 118 may act only to determine the end-points of each trip.

In other embodiments, location determination by the onboard device 118 may be by mechanisms other than strictly GPS signals. For example, in some embodiments, the location may be fully or partially determined based on the signals of the wireless network interface 306. For example, location may be broadly determined by knowing the location of a particular tower with which the wireless network interface 306 or cellular transceiver 304 is communicating. In other cases, location may be determined by triangulation if multiple towers are in communication range of the wireless network interface 306. In some cases, the determination of location based on the wireless communication network is performed by the processor of computer system 300 coupled to onboard device 118, but in other cases the tower information is sent to the operations center 100 to perform the bulk of the location calculations.

In another embodiment, location tracking may be accomplished by way of cellular signal triangulation. Still referring to FIG. 3, the onboard device 118 may further comprise a cellular transceiver 304, where the cellular transceiver 304 may communicate with nearby cellular towers in order to determine location by way of cellular signal triangulation.

In some cases, the location determined by the onboard device 118 may only be a position on the face of the earth, for example, latitude and longitude. The operations center 100, receiving a stream of locations from the onboard device 118, may correlate to streets and addresses. In other cases, the onboard device 118 may have sufficient memory and computing functionality to not only determine position in a latitude and longitude sense, but also to correlate the positions to cities, streets, block numbers and addresses.

Although the onboard devices 116 and 118 have been described as disablement capable and location tracking devices respectively, either device may be designed and implemented to achieve either of or both functionalities.

Onboard devices 116 and 118 may communicate wirelessly with each other by way of, in one example, wireless network interfaces 202 and 306, respectively. By way of wireless network interfaces 202 and 306, programs executed by the onboard device computer systems may communicate with each other. For simplification purposes, the discussion will refer to wireless network interface 306 coupled to onboard device 118; however, wireless network interface 202 may be configured and may operate in a similar way.

Referring still to FIG. 3, the illustrative wireless network interface 306 may have a limited distance over which communication may take place. The range over which communication may take place need not extend beyond the inside of the vehicle 114, where the onboard devices are located. The protocol over which the wireless network interface 306 communicates may likewise take many forms. In one embodiment, the wireless network interface 306 implements a radio frequency (RF) communication protocol (i.e., radio frequency communication by way of electromagnetic waves propagating through the air). For example, the communication may be implemented by way of ZIGBEE® brand network protocols, where the ZIGBEE® trademark is owned by Zigbee Alliance; or a Bluetooth communication protocol.

In another embodiment, communication between the onboard devices 116 and 118 is audible, sub-audible, or super-audible. For example, a microphone 308 (illustratively shown as part of onboard device 118) may couple to one or either of the onboard devices and receive an acoustic signal emitted from the other onboard device, such as speaker 204 (illustrative shown as part of onboard device 116) which can be recognized and analyzed by computer systems based on frequencies above, below, and within the audible range. In yet another embodiment, the two onboard devices may be connected by way of a hardwired connection (e.g., an Ethernet network).

Regardless of how the onboard devices communicate with each other, communication between the two devices may be indicative of two operable systems. In other words, as long as the devices are communicating with each other, there will be no alert sent related to suspected tampering.

If a driver tampers with one of the onboard devices, such as by removing the device, and thus breaks or severs the communication between onboard devices 116 and 118, the system may recognize that one or both of the onboard devices has been tampered with, and one of the onboard devices, such as onboard device 118, may send an indication of the last known location of vehicle 114 to the operations center 100 or to a third party, such as administrative agent 106. The indication of last known location may double as both an indication of tampering, and also as a way to aid the lending institution or third party in locating the vehicle.

Furthermore, onboard device 116 may be, in part, a starter relay replacement device, and thus may act as an operational starter relay when the onboard device 118 is communicatively coupled with onboard device 116. In the event communication is lost with the onboard device 118, the onboard device 116 may not provide current to the solenoid in spite of a command to do so, thus disabling the vehicle 114.

In one embodiment, severing the connection between the two onboard devices may also sever the power to one or more of the onboard devices, making it difficult to send off an alert indicative of tampering or an indication of last known location. Thus, one or more of the onboard devices 116 and 118 may be powered by a separate electric power supply 206 and/or 310, respectively. For purposes of simplification, discussion on the electric power supply will be made with reference to onboard device 118 and electric power supply 310; however, electric power supply 206 may be configured and may operate similarly.

Electric power supply 310 may be any device configurable for receiving and distributing electric power through the onboard device 118. Electric power supply 310 may have wires or cables for connecting a source of power. Further, electric power supply may be a battery; capacitor; supercapacitor; a low-voltage shared bus bar; or other electric charge storage device.

In one embodiment, electric power supply 310 is a supercapacitor. In particular, a supercapacitor may have a higher capacitance value per unit volume, with a capacitance value of up to 12,000 farads. Additionally, the supercapacitor may be able tolerate large numbers of rapid charge and discharge cycles. In the event that another source of electric power to one or more of the onboard devices is cut off, the supercapacitor may maintain enough voltage to send an alert to a third party, either directly by way of wireless network 110, or by way of the operations center 100, where, the alert may be an indication of last known location of the vehicle 114. Alternatively, for example, if power is cut off from onboard device 116 due to being removed from or disconnected from the vehicle 114, onboard device 116 may send a signal indicative of power loss (and thus potential tampering) to onboard device 118, requesting an alert be sent to the operations center or a third party. In order to reduce the amount of battery power needed for the onboard devices to communicate with one another, or for the onboard devices to communicate with remote locations, communications related to operability may be sent at periodic, as opposed to continuous, intervals. For example, the onboard devices may communicate with each other when the ignition system of the vehicle is activated. In another example, the onboard devices may communicate with each other every hour.

In the above discussion, onboard device 116 is described as having the capability to selectively disable the vehicle from a command issued from the operations center 100. Furthermore, onboard device 118 has been described as having the capability to track the location of the vehicle through a plurality of location tracking devices and methods, as well as having the capability to send a last known location indication to a third party when communication with the onboard device 116 has been broken. In another embodiment, however, onboard device 116 may also have the capability to track location, and send off a last known location indication if tampering has occurred. Thus, in this alternative embodiment, both onboard devices have the capability to send off a last-known indication of location if power to the other onboard device has been cut.

Although the above description has discussed ascertaining whether tampering has occurred between two communicatively coupled onboard devices, any number of onboard devices may be contemplated. Furthermore, although the above discussion refers to at least two onboard devices communicatively coupled, it is also possible that two or more onboard devices are coupled by a hardwire connection, such as electrical wires or cables.

In at least one embodiment, onboard device 118 may have a cellular transceiver 304 capable of communicating with the operations center 100 over a cellular network. The cellular network may be wireless network 110. The operations center 100 may send messages to onboard device 118 through the wireless network 110. Onboard device 118 may send messages to operations center 100 through the wireless network 110. The messages may be delivered via any method available to the wireless network 110, such as via phone call, text message, or data transmission capabilities. At least some embodiments may be capable of delivering the messages using one or more methods. Messages may be commands, status information, system updates, or any other information to be exchanged between the operations center 100 and onboard device 118. Status information may include the value of a timer 210 (described later herein), whether the vehicle 114 is currently being disabled by disablement system 208, location of the onboard device 118, whether the vehicle is currently active (e.g., is the engine running), or other status or diagnostic information about the vehicle 114, onboard device 116, or onboard device 118.

In one embodiment, onboard device 118 may use wireless network interface 306 to communicate with onboard device 116 through wireless network interface 202. The operations center 100 and onboard device 116 may send each other messages via onboard device 118. In sending a message from operations center 100 to onboard device 116, the message may be sent via wireless network 110 to the cellular transceiver 304 of onboard device 118, and onboard device 118 may then send the message (which may be a modified message or a relayed transmission of same message) to onboard device 116 via wireless network interface 306 and wireless network interface 202; while onboard device 116 may send a message to operations center 100 using the reverse path. The operations center 100 may send a disable command to onboard device 116 via onboard device 118. As a result of receiving the disable command, onboard device 116 may cause disablement system 208 to disable the vehicle 114.

In at least some embodiments, onboard device 116 may include a timer 210. The timer 210 may be implemented in software or hardware. The timer 210 may be a fully or partially separate component of onboard device 116. Alternatively, timer 210 may be included as part of computer system 200 or disablement system 208. The timer 210 may be coupled to disablement system 208 and cause the disablement system 208 to disable vehicle 114 upon expiration of the timer 210. The timer 210 may be a countdown timer that periodically decrements a timer value and expires upon reaching zero. Alternatively, the timer 210 may be a calendar- or clock-style timer, and expire at a particular date and/or time. Numerous other types of timers and variations thereof could be used as the timer 210 in at least some embodiments. After expiration, the timer 210 may be reconfigured or reset, as described further below. Alternatively, the timer 210 may be reconfigured or reset while performing its timing. This may increase or decrease the amount of time before expiring. In some embodiments, the timer 210 may be configured to expire after any arbitrarily specified amount of time. In other embodiments, the timer 210 may only be set to the same time period (e.g., it can only be set to expire after 33 days). In yet other embodiments, the timer 210 may only be set to expire after one of a limited number of pre-set time periods (e.g., one of: 20 minutes, 1 hour, or 33 days). Alternatively, the timer 210 could be included in onboard device 118, and the expiration of the timer 210 communicated from onboard device 118 to onboard device 116 through a message via wireless network interface 306 and wireless network interface 202.

In one embodiment, the operations center 100 may send a message to onboard device 116, where the message includes a timer command. The timer command may instruct onboard device 116 to reset the timer 210 to a default value (such as 33 days) or to set the timer 210 to a specific value. The specific value may be included in the same or a different message.

In accordance with at least some of the embodiments, vehicle 114 may be outfitted with onboard device 116 and onboard device 118. The vehicle 114 may be sold to a customer. If certain conditions are met (e.g., non-payment of a loan), the vehicle 114 may be disabled via the disablement system 208. The location of the vehicle 114 may also be transmitted to the operations center 100. The vehicle may be disabled by the expiration of a timer 210, due to a command from the operations center 100, or due to non-receipt of an operability signal (such as due to tampering). In the case of a timer 210, the timer 210 may be set to expire after 33 days. If conditions for continued operation of the vehicle 114 are met, the operations center 100 may send a command to onboard device 116 to reset the timer 210 to another 33 days. Depending on the conditions for continued operation of the vehicle 114, the timer 210 may be set to a longer or shorter duration of time. The operations center 100 could also set the timer 210 to some other duration, such as in the case of an emergency need to operate the vehicle 114. Alternatively, the operations center 100 may send a command to onboard device 116 to disable the vehicle 114. This may include setting the timer 210 to a short duration (e.g., one second, one minute, or one hour). Alternatively, the timer 210 may also be set to a short duration if tampering is detected. In cases of tamper detection, the setting of the timer 210 may be prompted by onboard device 116, onboard device 118, or the operations center 100. Thus, in some embodiments, the vehicle 114 may be disabled either due to a command from the operations center 100 or by expiration of a timer 210.

Figure 4:
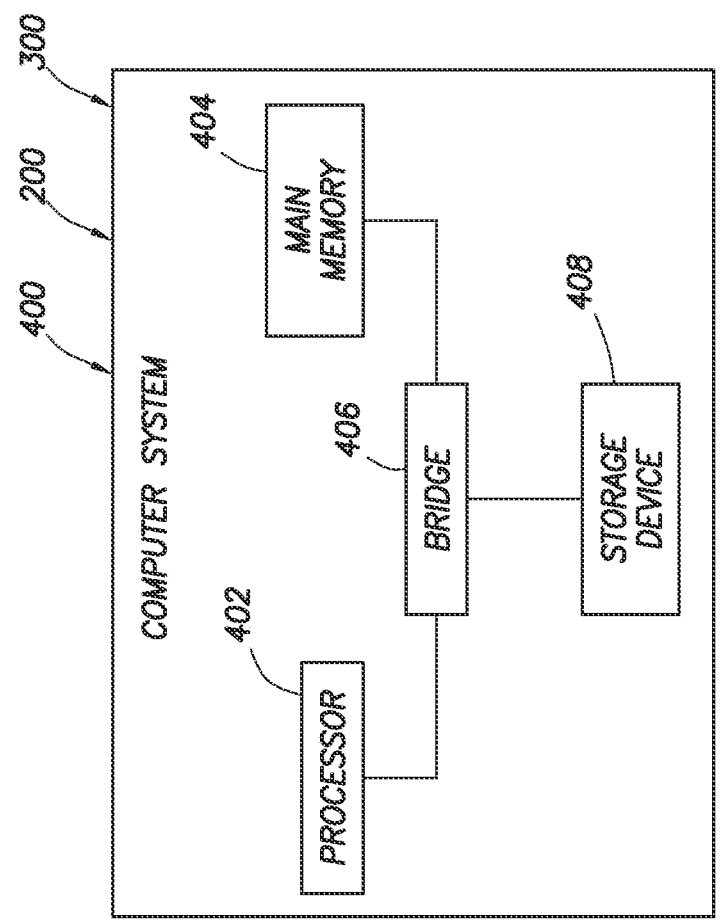
FIG. 4 shows, in block diagram form, a computer system in accordance with at least some embodiments.

FIG. 4 shows a computer system 400, which is illustrative of a computer system upon which the various embodiments may be practiced. The computer system 400 may be illustrative of, for example, computer system 200 coupled to the onboard device 116. In another embodiment, the computer system 400 may be illustrative of, for example, computer system 300 coupled to the onboard device 118. In yet another embodiment, computer system 400 may be illustrative of processor 102. The computer system 400 comprises a processor 402, and the processor couples to a main memory 404 by way of a bridge device 406. Moreover, the processor 402 may couple to a long term storage device 408 (e.g., a hard drive, solid state disk, memory stick, optical disc) by way of the bridge device 406. Programs executable by the processor 402 may be stored on the storage device 408, and accessed when needed by the processor 402. The program stored on the storage device 408 may comprise programs to implement the various embodiments of the present specification, such as sending an indication of the last known location of vehicle 114 in the event of device tampering. In some cases, the programs are copied from the storage device 408 to the main memory 404, and the programs are executed from the main memory 404. Thus, the main memory 404, and storage device 408 shall be considered computer-readable storage mediums.

Figure 5:
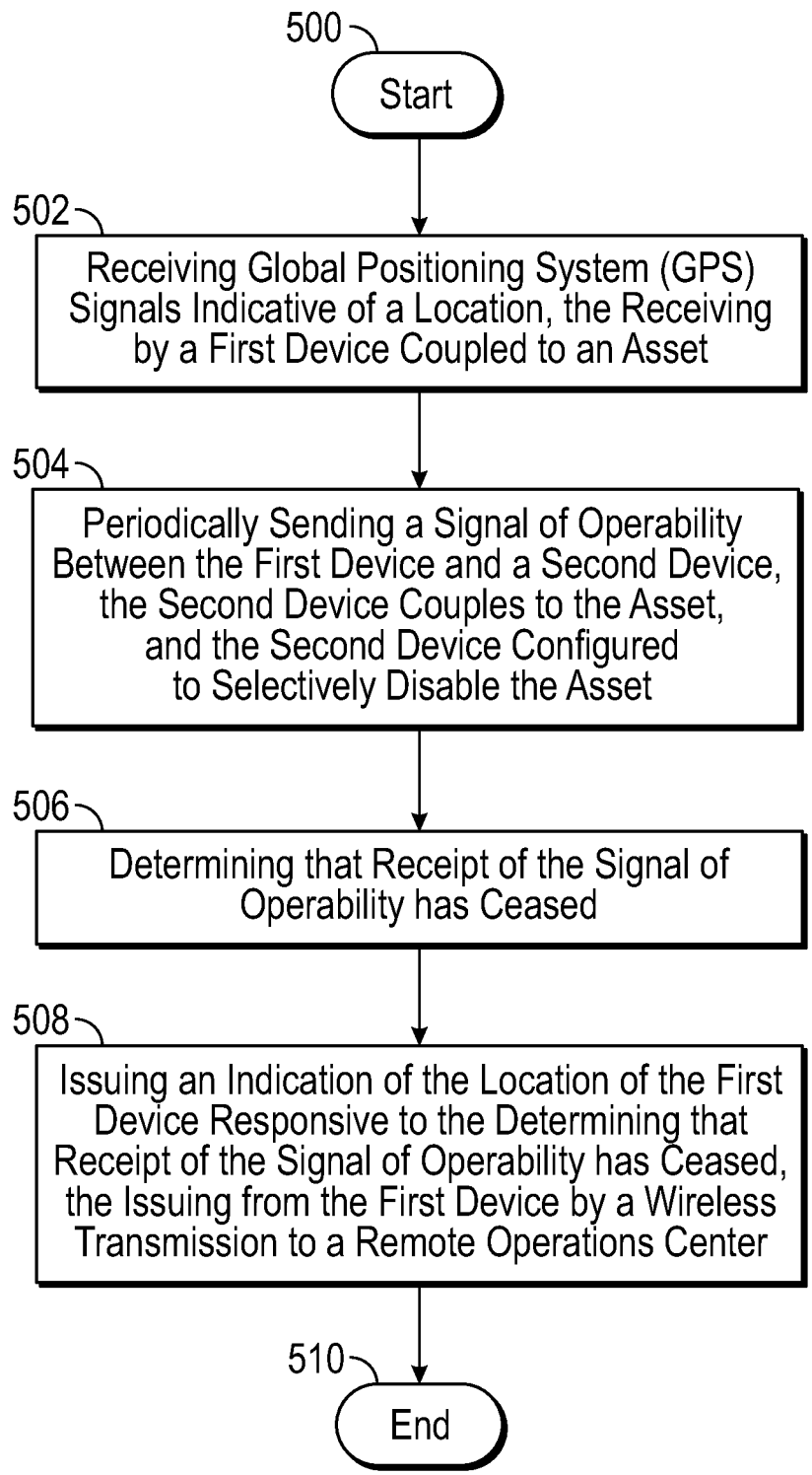
FIG. 5 shows a flow diagram depicting an overall method in accordance with at least some embodiments.

A method of remote tamper detection will now be discussed in more detail. FIG. 5 shows a flow diagram depicting an overall method of detecting whether tampering has occurred with respect to location tracking and disablement devices. The method starts (block 500) by receiving Global Positioning System (GPS) signals indicative of a location, the receiving by a first device coupled to an asset (block 502). The method moves to periodically sending a signal of operability between the first device and a second device, the second device coupled to the asset, and the second device configured to selectively disable the asset (block 504); determining that receipt of the signal of operability has ceased (block 506); and issuing an indication of the location of the first device responsive to the determining that receipt of the signal of operability has ceased, the issuing from the first device by a wireless transmission to a remote operations center (block 508). Thereafter, the method ends (block 510).

Figure 6:
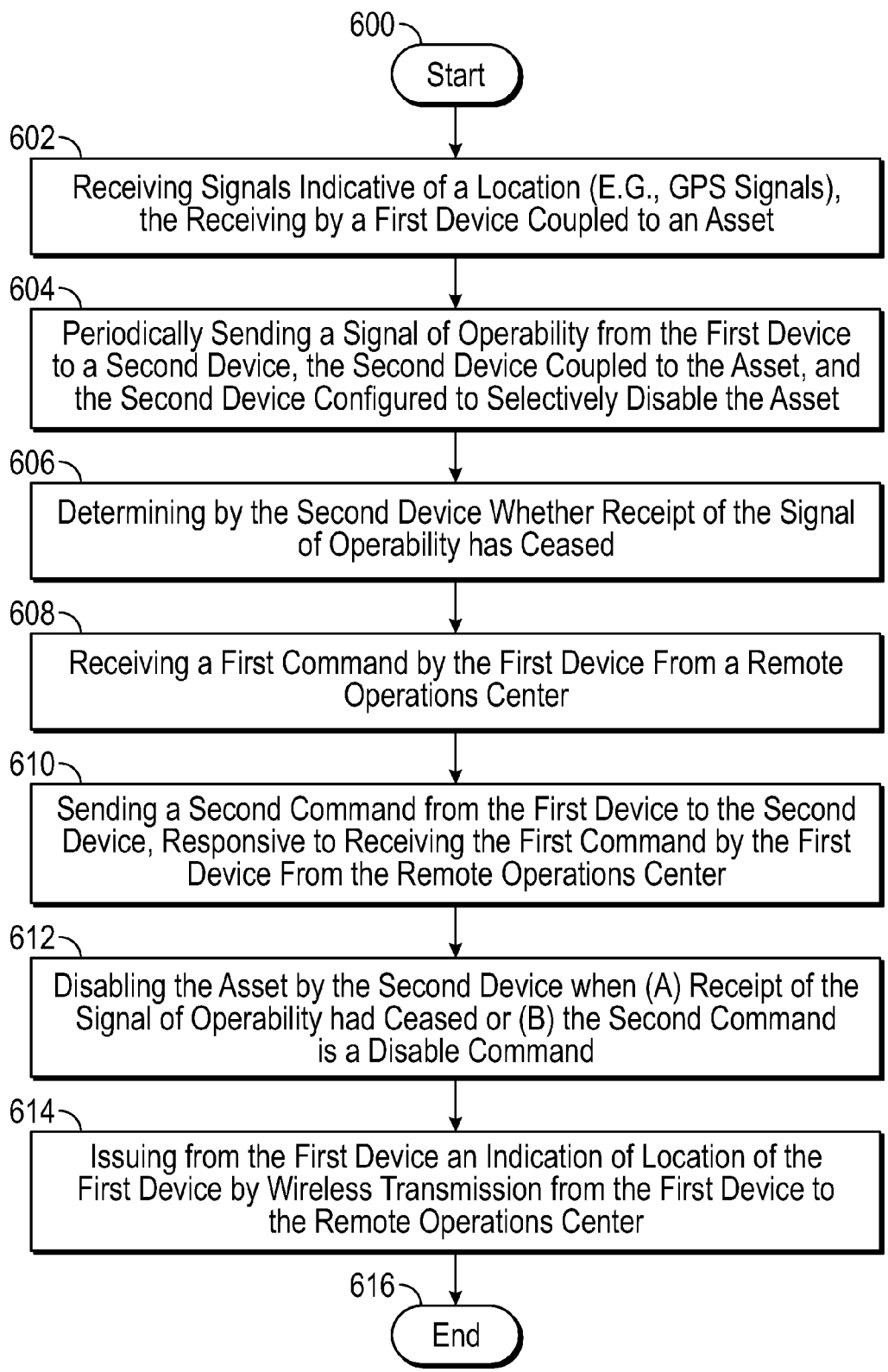
FIG. 6 shows a flow diagram depicting an overall method in accordance with at least some embodiments.

FIG. 6 shows a flow diagram depicting at least one embodiment of an overall method of detecting whether tampering has occurred with respect to location tracking and disablement devices. The method starts (block 600) by receiving signals indicative of a location (e.g., GPS signals), the receiving by a first device coupled to an asset (block 602). As discussed elsewhere in this specification, the signals may be GPS signals, wireless network signals, or cellular network signals. The method moves to periodically sending a signal of operability from the first device to a second device, the second device coupled to the asset, and the second device configured to selectively disable the asset (block 604). In at least some embodiments, signals of operability may also be sent from the second device to the first device. The signals of operability from the second device to the first device may or may not be wholly or partially independent of the signals of operability from the first device to the second device. The method moves to determining by the second device whether receipt of the signal of operability has ceased (block 606). In at least some embodiments, the first device may also determine whether receipt of signals of operability have ceased. The method moves to receiving a first command by the first device from a remote operations center (block 608). The method moves to sending a second command from the first device to the second device, responsive to receiving the first command by the first device from the remote operations center (block 610). In at least some embodiments, the first command is relayed to the second device through the first device. In at least some embodiments, the second command is the same as the first command. In at least some embodiments, the first command includes a command for the first device and the same (or a different) command for the second device. In at least some embodiments, a command received by the first device may not result in sending a responsive command to the second device (e.g., the first device may be capable of handling the command itself). The method moves to disabling the asset by the second device when (a) receipt of the signal of operability has ceased or (b) the second command is a disable command (block 612). In at least some embodiments, other conditions may additionally cause disabling of the asset. In at least some embodiments the second command is not a disable command. The method moves to issuing from the first device an indication of location of the first device by wireless transmission from the first device to the remote operations center (block 614). In at least some embodiments, the issuing of an indication of location occurs responsive to disabling the asset. In at least some embodiments, the issuing of an indication of location occurs responsive to determining that receipt of the signal of operability has ceased. In at least some embodiments, the issuing of an indication of location occurs responsive to a command from the remote operations center. In at least some embodiments, the first device may also send a message to the remote operations center. The message may include status information about the asset, the first device, or the second device. In at least some embodiments, the issuing of an indication of the location of the first device may be performed by sending a message from the first device to the remote operations center. In at least some embodiments, the message may include an indication of the location of the first device as well as status information. In at least some embodiments, the message may be sent responsive to activating the asset (e.g., turning the ignition). In at least some embodiments, the message may include information about a power source (e.g., a battery, supercapacitor, or other power source coupled to the first device or second device), such as an amount of charge remaining. Thereafter, the method ends (block 616).

Figure 7:
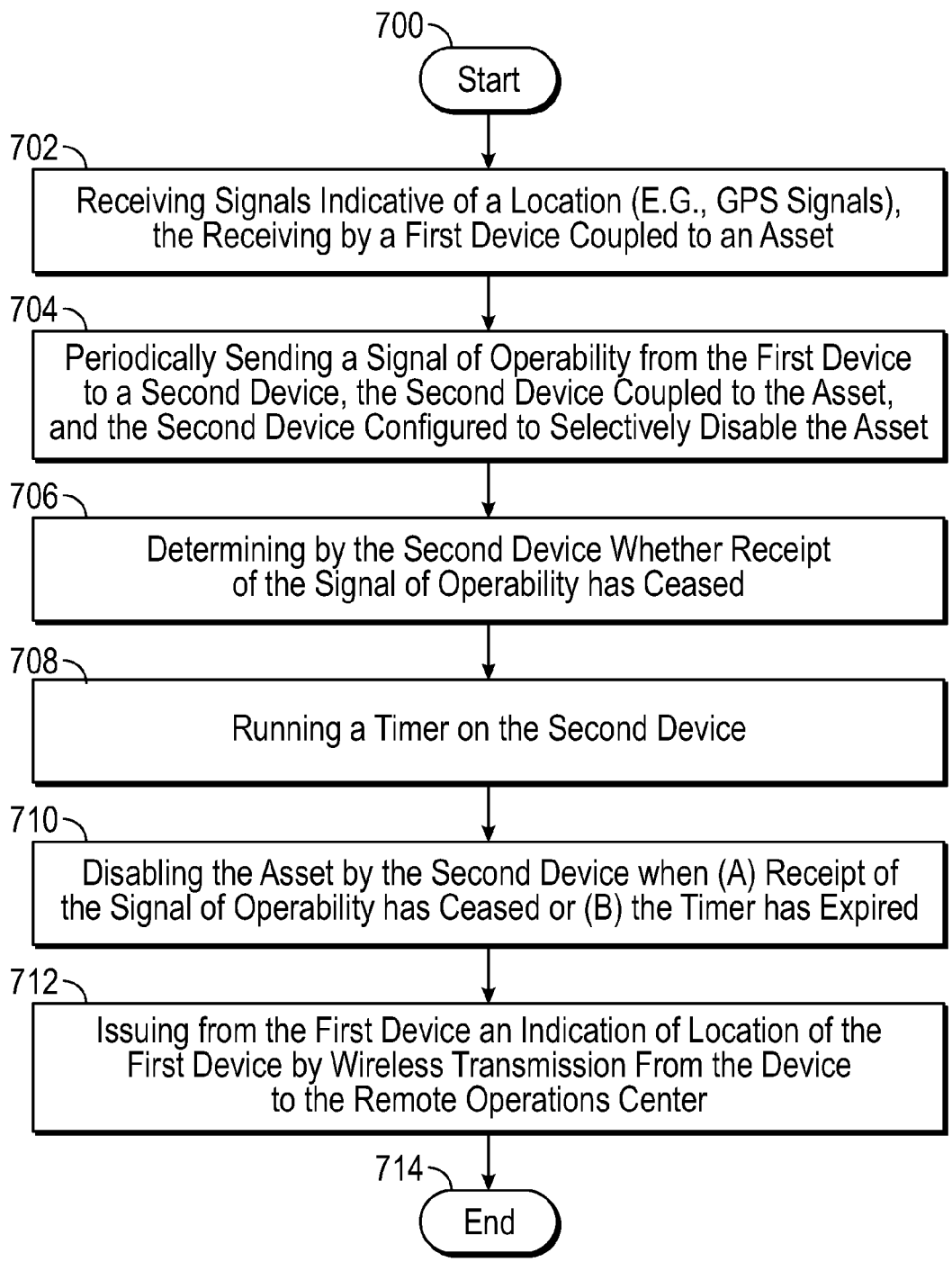
FIG. 7 shows a flow diagram depicting an overall method in accordance with at least some embodiments.

FIG. 7 shows a flow diagram depicting at least one embodiment of an overall method of detecting whether tampering has occurred with respect to location tracking and disablement devices. The method starts (block 700) by receiving signals indicative of a location (e.g., GPS signals), the receiving by a first device coupled to an asset (block 702). As discussed elsewhere in this specification, the signals may be GPS signals, wireless network signals, or cellular network signals. The method moves to periodically sending a signal of operability from the first device to a second device, the second device coupled to the asset, and the second device configured to selectively disable the asset (block 704). In at least some embodiments, signals of operability may also be sent from the second device to the first device. The signals of operability from the second device to the first device may or may not be wholly or partially independent of the signals of operability from the first device to the second device. The method moves to determining by the second device whether receipt of the signal of operability has ceased (block 706). In at least some embodiments, the first device may also determine whether receipt of signals of operability have ceased. The method moves to running a timer on the second device (block 708). The method moves to disabling the asset by the second device when (a) receipt of the signal of operability has ceased or (b) the timer has expired (block 710). In at least some embodiments, other conditions may additionally cause disabling of the asset. In at least some embodiments, the timer expires by counting down to zero. The method moves to issuing from the first device an indication of location of the first device by wireless transmission from the first device to the remote operations center (block 712). In at least some embodiments, the issuing of an indication of location occurs responsive to disabling the asset. In at least some embodiments, the issuing of an indication of location occurs responsive to determining that receipt of the signal of operability has ceased. In at least some embodiments, the issuing of an indication of location occurs responsive to the expiration of the timer. In at least some embodiments, the first device may receive a first command from a remote operations center. The first device may send a second command to the second device, responsive to receiving the first command from the remote operations center. The value of the timer may be changed in response to receiving the second command. Thereafter, the method ends (block 714).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, the various embodiments have been described in terms of detecting tampering of a remote location tracking device. This context, however, shall not be read as a limitation as to the scope of one or more of the embodiments described—the same techniques may be used for other embodiments. It is intended that the following claims be interpreted to embrace all such variations and modifications.

We claim:

1. A method comprising:
    receiving signals indicative of a location, the receiving by a first device coupled to an asset;
    periodically sending a signal of operability from the first device to a second device, the second device coupled to the asset, and the second device configured to selectively disable the asset;
    determining by the second device whether receipt of the signal of operability has ceased;
    receiving a first command from a remote operations center, the receiving by the first device;
    sending a second command from the first device to the second device, wherein the second command is sent responsive to the receiving of the first command;
    disabling the asset by the second device when (a) receipt of the signal of operability has ceased or (b) the second command is a disable command; and
    issuing from the first device an indication of the location of the first device, the issuing from the first device by a wireless transmission to the remote operations center.

2. The method of claim 1 wherein the signals indicative of a location comprise GPS signals.

3. The method of claim 1 further comprising:
    periodically sending a second signal of operability from the second device to the first device;
    determining by the first device whether receipt of the second signal of operability has ceased; and
    wherein the issuing from the first device an indication of the location of the first device occurs when receipt of the second signal of operability has ceased.

4. The method of claim 1 further comprising:
    sending a message from the first device to the remote operations center, wherein the message includes status information about the asset.

5. The method of claim 4 wherein the message is sent responsive to activating the asset.

6. The method of claim 4 wherein the message includes an indication of the location of the first device.

7. The method of claim 1 wherein disabling the asset by the second device further comprises disabling by way of at least one selected from the group consisting of: a starter interrupt; a fuel pump relay disablement; or spark ignition system disablement.

8. The method of claim 1 further comprising:
sending a message from the first device to the remote operations center, wherein the message includes status information about the first device or second device.

9. The method of claim 8 wherein the status information includes information about a power source.

10. A method comprising:
receiving signals indicative of a location, the receiving by a first device coupled to an asset;
periodically sending a signal of operability from the first device to a second device, the second device coupled to the asset, and the second device configured to selectively disable the asset;
determining by the second device whether receipt of the signal of operability has ceased;
running a timer on the second device;
disabling the asset by the second device when (a) receipt of the signal of operability has ceased or (b) the timer has expired; and
issuing from the first device an indication of the location of the first device, the issuing from the first device by a wireless transmission to a remote operations center.

11. The method of claim 10 further comprising:
receiving a first command from a remote operations center, the receiving by the first device;
sending a second command from the first device to the second device, wherein the second command is sent responsive to the receiving of the first command; and
changing the value of the timer in response to the receiving of the second command.

12. The method of claim 11 wherein the timer counts down to zero.

13. The method of claim 11 further comprising:
periodically sending a second signal of operability from the second device to the first device;
determining by the first device whether receipt of the second signal of operability has ceased; and
issuing from the first device a notification to the remote operations center when receipt of the second signal of operability has ceased.

14. A system comprising:
a first onboard device comprising:
a first processor;
a cellular network interface coupled to the first processor;
a first wireless network interface coupled to the first processor;
a location determination device coupled to the first processor;
a first memory coupled to the first processor, the first memory storing a first program that, when executed by the first processor, causes the first processor to:
receive signals indicative of a location of the first onboard device, the receipt by way of the location determination device;
receive periodic signals of operability from a second onboard device;
determine the signals of operability have ceased to be received;
issue an indication of the location of the first onboard device over the cellular network interface to a remote operations center, the issuance responsive to the determination that the signals of operability have ceased to be received;
receive a first command from the remote operations center through the cellular network interface; and
transmit a second command through the first wireless network interface to the second onboard device, wherein the second command is transmitted responsive to the receiving of the first command;
the second onboard device comprising:
a second processor;
a second wireless network interface coupled to the second processor;
a second memory coupled to the second processor, the second memory storing a second program that, when executed by the second processor causes the second processor to:
periodically issue the signals of operability to the first onboard device;
receive the second command through the second wireless network interface; and
disable the asset responsive to the second command.

15. The system of claim 14 wherein the location determination device includes a global positioning receiver.

16. The system of claim 14 wherein disabling the asset further comprises disabling the asset by way of: a starter interrupt; a fuel pump relay disablement; or spark ignition system disablement.

17. The system of claim 14 wherein the second onboard device further comprises:
a timer;
wherein the second program further causes the second processor to disable the asset on expiration of the timer.

18. The system of claim 17 wherein the timer includes a countdown timer.

19. The system of claim 17 wherein the second command includes:
a timer command;
wherein the second program further causes the value of the timer to be changed responsive to the timer command.

20. The system of claim 14 wherein the second command is a relayed transmission of the first command.

21. The system of claim 14 wherein the indication of the location of the first onboard device comprises a latitude and a longitude.

* * * * *